US006523633B1

United States Patent
Teraoka et al.

(10) Patent No.: US 6,523,633 B1
(45) Date of Patent: *Feb. 25, 2003

(54) FOUR-WHEEL DRIVE VEHICLE POWER TRAIN

(75) Inventors: Masao Teraoka, Tochigi-ken (JP); Yasuhiko Ishikawa, Tochigi-Ken (JP); Hiroyuki Tanaka, Tochigi-Ken (JP)

(73) Assignee: Tochigi Fuji Sangyo Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/984,583

(22) Filed: Dec. 3, 1997

(30) Foreign Application Priority Data

Dec. 4, 1996 (JP) .............................. 8-324300

(51) Int. Cl.⁷ ............................................ B60K 17/344
(52) U.S. Cl. ..................................................... 180/248
(58) Field of Search ................................. 180/233, 247, 180/248, 249, 250, 245; 425/204, 206

(56) References Cited

U.S. PATENT DOCUMENTS

| | | | | |
|---|---|---|---|---|
| 3,752,014 A | * | 8/1973 | Holtan ........................ 475/295 |
| 5,041,068 A | * | 8/1991 | Kobayashi ................... 475/221 |
| 5,042,610 A | * | 8/1991 | Shiraishi et al. ............. 180/249 |
| 5,056,614 A | * | 10/1991 | Tokushima et al. ......... 180/248 |
| 5,058,700 A | * | 10/1991 | Shibahata .................... 180/245 |
| 5,064,017 A | * | 11/1991 | Kikuchi et al. .............. 180/248 |
| 5,069,305 A | * | 12/1991 | Kobayashi ................... 180/249 |
| 5,071,396 A | * | 12/1991 | Kobayashi ................... 475/249 |
| 5,083,478 A | * | 1/1992 | Hiraiwa ........................ 180/247 |
| 5,083,635 A | * | 1/1992 | Tashiro ........................ 180/248 |
| 5,098,351 A | * | 3/1992 | Koybayashi .................. 475/86 |
| 5,141,071 A | * | 8/1992 | Shibahata et al. ........... 180/249 |
| 5,141,072 A | * | 8/1992 | Shibahata .................... 180/245 |
| 5,193,639 A | * | 3/1993 | Hara et al. ................... 180/248 |
| 5,221,101 A | * | 6/1993 | Okubo et al. ................ 180/247 |
| 5,234,072 A | * | 8/1993 | Chludek ....................... 180/248 |
| 5,282,518 A | * | 2/1994 | Yamasaki et al. ........... 180/233 |
| 5,348,516 A | * | 9/1994 | Shibata ........................ 475/206 |
| 5,409,429 A | * | 4/1995 | Showalter et al. .......... 475/295 |
| 5,685,389 A | * | 11/1997 | Müller ......................... 180/249 |
| 5,704,863 A | * | 1/1998 | Zalewski et al. .............. 475/88 |
| 5,704,867 A | * | 1/1998 | Bowen ......................... 475/221 |
| 5,867,092 A | * | 2/1999 | Vogt ............................. 340/456 |

\* cited by examiner

*Primary Examiner*—Robert P. Olszewski
*Assistant Examiner*—Andrew J. Fischer
(74) *Attorney, Agent, or Firm*—Morrison & Foerster LLP

(57) ABSTRACT

A first power train (T1) for driving a pair of front drive wheels (Wf1, Wf2) comprises a transmission (5) connected to an engine (3) and a front drive train (Df1) including a front final reduction gear (9) connected to the transmission and a front differential gear (15) connected between the front final reduction gear and the front drive wheels, and a second power train (T2) for driving a pair of rear drive wheels (Wr1, Wr2) comprises a rear transfer train (Tr1) branched from the front drive train between the front final reduction gear and the front differential gear and a rear drive train (Dr) connected to the rear drive wheels.

4 Claims, 10 Drawing Sheets

FOUR-WHEEL DRIVE VEHICLE POWER TRAIN

BACKGROUND OF THE INVENTION

1. Field of the Invention

The present invention generally relates to a power train, and particularly, it relates to a power train for four-wheel drive vehicles.

2. Description of Relevant Art

There has been disclosed a four-wheel drive vehicle power train (hereafter "first conventional power train") in Japanese Patent Application Laid-Open Publication No. 3-224829, another four-wheel drive vehicle power train (hereafter "second conventional power train") in U.S. Pat. No. 5,188,574, and still another four-wheel drive vehicle power train (hereafter "third conventional power train") in U.S. Pat. No. 4,700,800.

Figure 1:
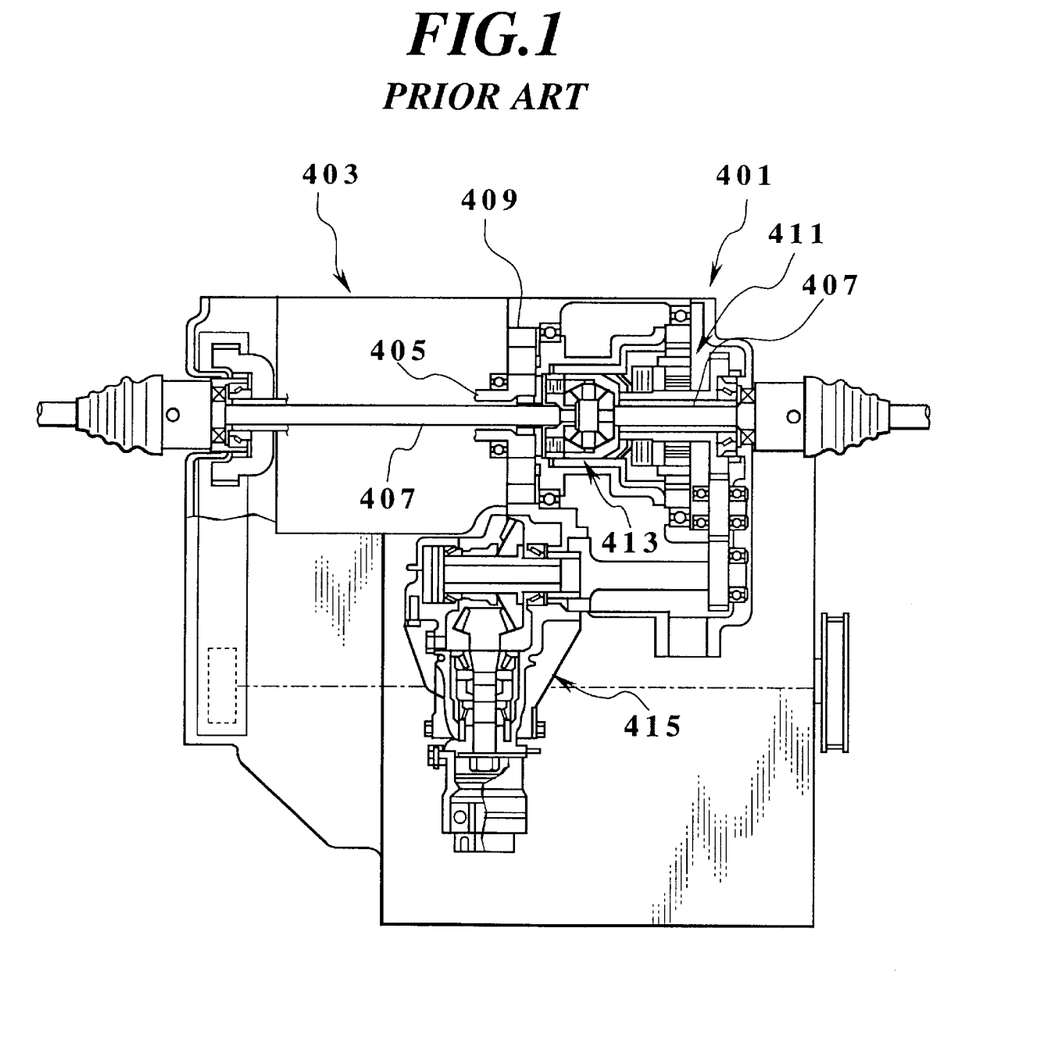
FIG. 1 is a section of a conventional power train.

The first conventional power train has a transmission and a power transfer device illustrated in FIG. 1, where they are designated by reference characters 403 and 401, respectively. The power transfer device 401 includes a front drive train 409+411+413 and a rear transfer train 415. The front drive train includes a planetary type final reduction gear 409 arranged coaxial to a transversely extending output shaft 405 of the transmission 403, a planetary type center differential gear 411 and a front differential gear 413.

Drive torque from the transmission 403 is supplied from the output shaft 405, via the final reduction gear 409, to the center differential gear 411, where it is shared to be distributed on the one hand through the front differential gear 413 to left and right front axles 407, and on the other hand through the rear transfer train 415 to rear axles. The left front axle 407 extends through the transmission output shaft 405.

Figure 2:
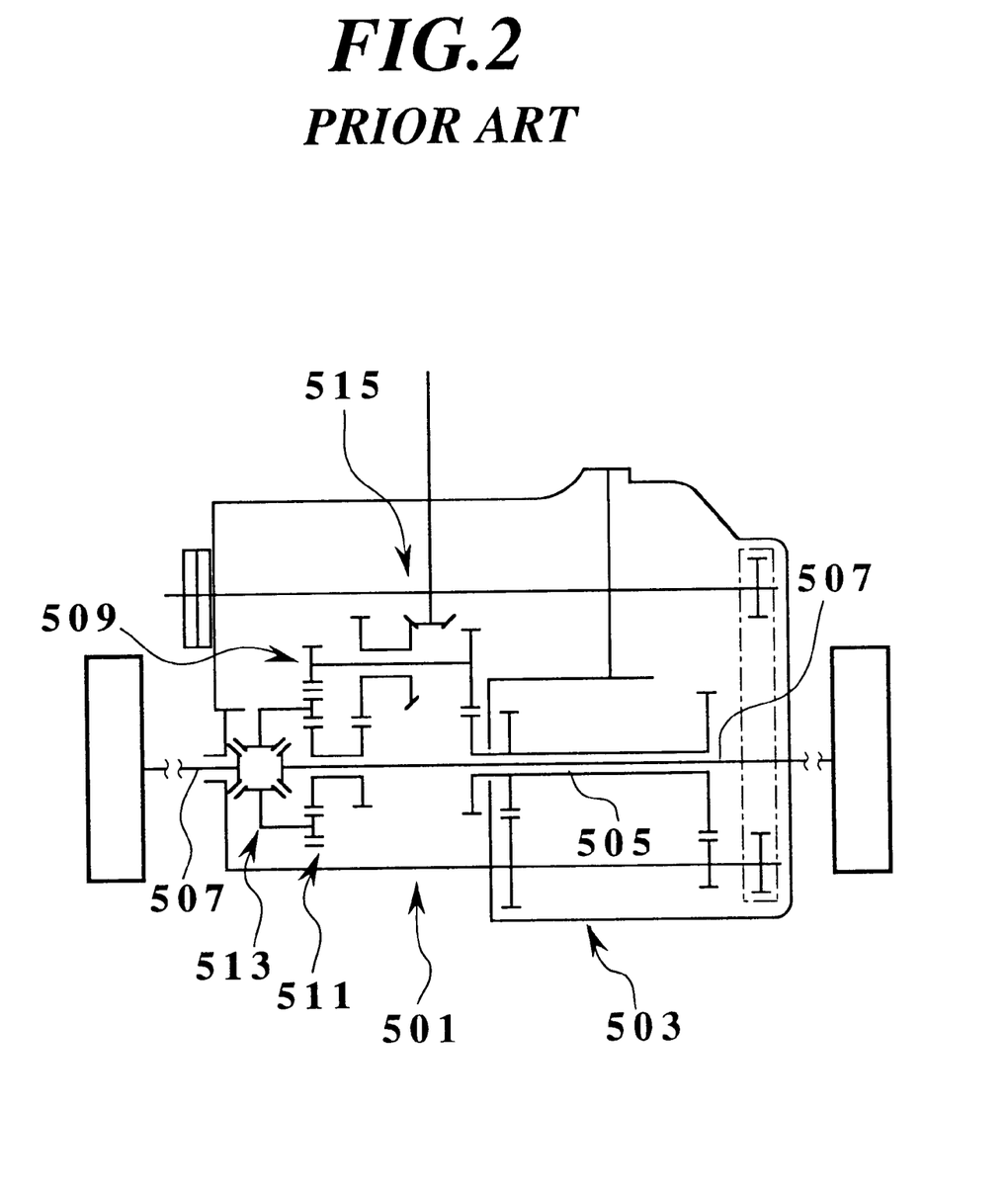
FIG. 2 is a block diagram of another conventional power train.

The second conventional power train has a transmission and a power transfer device illustrated in FIG. 2, where they are designated by reference characters 503 and 501, respectively. The power transfer device 501 includes a drive train 509+511+513 and a transfer train 515. The drive train includes a final reduction gear 509 arranged parallel to an output shaft 505 of the transmission 503, a planetary type center differential gear 511 and a bevel differential gear 513.

Drive torque from the transmission 503 is supplied from the output shaft 505, via the final reduction gear 509, to the center differential gear 511, where it is shared to be distributed on the one hand through the differential gear 513 to a pair of left and right axles 507, and on the other hand through the transfer train 515 to another pair of axles. The right axle 507 extends through the transmission output shaft 505.

Figure 3:
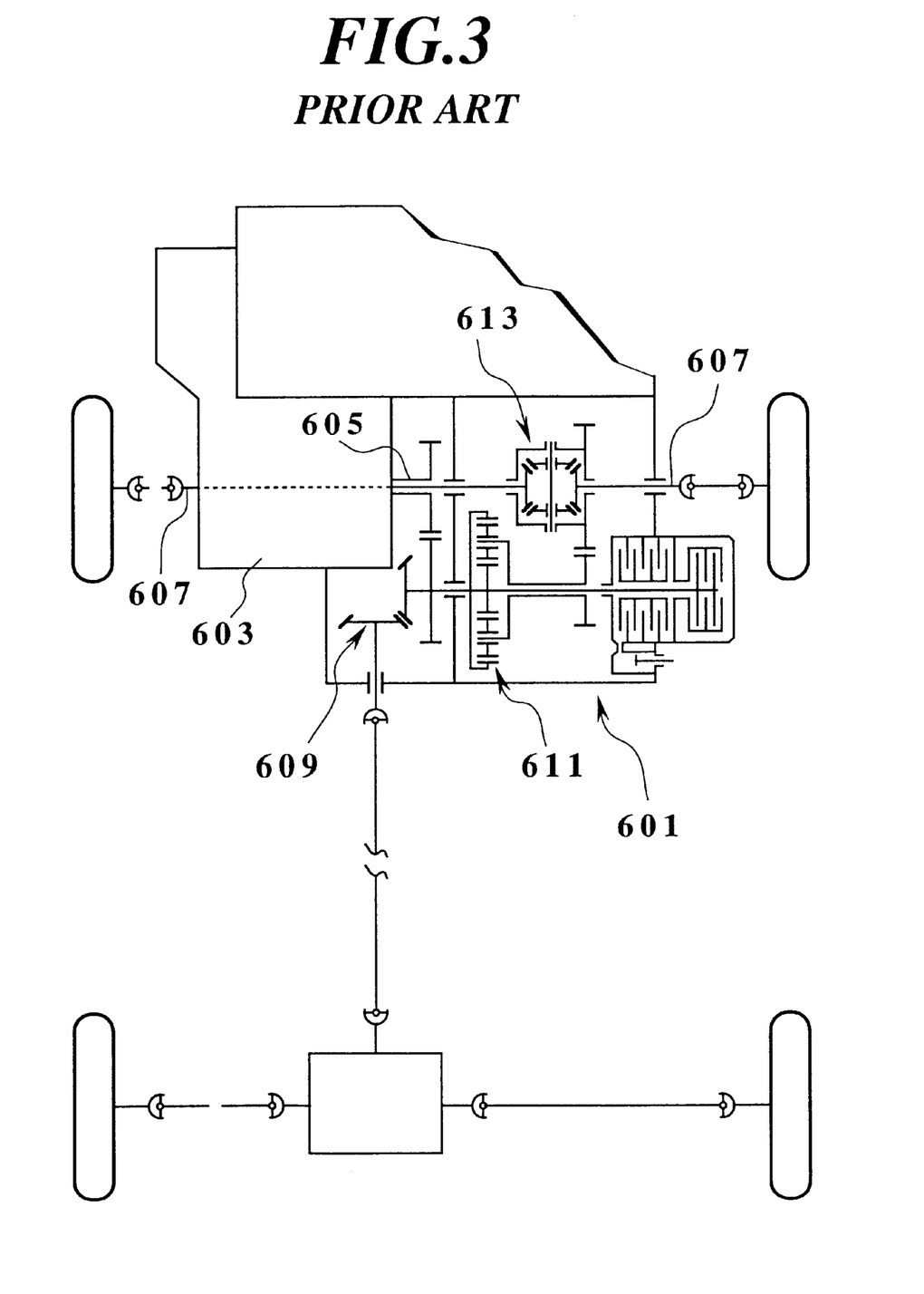
FIG. 3 is a block diagram of another conventional power train.

The third conventional power train is illustrated in FIG. 3 and has a transmission 603 and a power transfer device 601. This power transfer device 601 includes a front drive train 611+613 and a rear transfer train 609. The front drive train includes a planetary type center differential gear 611 and a front differential gear 613.

Drive torque from the transmission 603 is supplied from the output shaft 605 on the one hand directly to the rear transfer train 609, and on the other hand via the center differential gear 611 to the front differential gear 613, where it is shared to be distributed to left and right front axles 607. The left axle 607 extends through the transmission output shaft 605.

In the conventional four-wheel drive vehicle power trains described, their power transfer devices 401, 501, 601 each respectively include a drive train having a center differential gear 411, 511, 611 supplying drive torque to a differential gear 413, 513, 613, where it is differentially distributed to an associated pair of left and right axles 407, 507, 607. Therefore; in modification for application to a two-wheel drive vehicle, each power train needs a significantly wide re-design covering most of principal components such as differential gears and housings associated with torque transmission lines, as their commonality is low.

As a result, four-wheel drive vehicles need dedicated components therefor with increase in size and weight.

Moreover, the first and second conventional power trains have their drive trains elongated along associated axles 407, 507 with undesirable effects on a suspension stroke.

SUMMARY OF THE INVENTION

The present invention has been achieved with such points in view.

It therefore is an object of the present invention to provide a power train with an increased commonality between a two-wheel drive vehicle and a four-wheel drive vehicle, permitting a down-scaled, light-weighted design.

To achieve the object, a first aspect of the present invention provides a power train for a vehicle with an engine and a total of four drive wheels, the power train comprising a first power train for driving a first pair of drive wheels, the first power train comprising a transmission connected to the engine, and a first drive train comprising a first final reduction gear connected to the transmission, and a first differential gear connected between the first final reduction gear and the first pair of drive wheels, and a second power train for driving a second pair of drive wheels, the second power train comprising a power transfer train branched from the first drive train between the first final reduction gear and the first differential gear, and a second drive train connected to the second pair of drive wheels.

According to the first aspect, a first drive train for a four-wheel drive vehicle is employable for a two-wheel drive vehicle and has an increased commonality therebetween.

According to a second aspect of the invention, the first final reduction gear is connected to an output shaft of the transmission, the first differential gear has an input element thereof driven by the final reduction gear and an output element thereof driving an axle of one of the first pair of drive wheels, and the output shaft and the input element have rotation axes thereof aligned to the axle.

According to the second aspect, a first drive train for a four-wheel drive vehicle may have an input element eliminated therefrom, permitting a common use to a two-wheel drive vehicle with a flexibility in design to have an increased transverse axle length outside a first power train Further, a reverse application to the four-wheel drive vehicle can be achieved without an undesirable increase in transverse size or weight.

According to a third aspect of the invention, the power train further comprises a branching element formed on the input element for branching the power transfer train from the first drive train.

According to the third aspect, an ensured branching is allowed with a simplified supporting structure.

According to a fourth aspect of the invention, the input element comprises an integral part of a differential casing member of the first differential gear.

According to the fourth aspect, a first differential gear as well as a branching element has a simplified supporting structure, permitting an increased commonality of a differential casing member and a reduced cost.

According to a fifth aspect of the invention, the power transfer train includes a drive transfer mechanism connected to the input element for transferring drive torque shared therefrom in a first direction crossing the axle.

According to the fifth aspect, a first drive train for a four-wheel drive vehicle may be employed, as it is, for a two-wheel drive vehicle.

According to a sixth aspect of the invention, the drive transfer mechanism comprises a chain transmission mechanism.

According to the sixth aspect, a drive transfer mechanism has an increased flexibility in spatial arrangement with relaxed criteria for connection accuracy. Further, a second power train may stand free of noises and vibrations from a first power train.

According to a seventh aspect of the invention, the power transfer train further includes a transfer path displacing mechanism for displacing a transfer path of the drive torque in a second direction crossing the first direction.

According to the seventh aspect, a power transfer train permits a drive connection to a second power train to be arranged close to a longitudinal centerline of vehicle, with an improved weight balance.

According to an eighth aspect of the invention, the transfer path displacing mechanism comprises a drive bevel member rotatable about an axis parallel to the axle and a driven bevel member meshing with one of mutually opposite sides of the drive bevel member near to the transmission.

According to the eighth aspect, a power transfer train has a reduced longitudinal dimension.

According to a ninth aspect of the invention, the transfer path displacing mechanism comprises a drive bevel element fixed on a shaft member rotatably supported by a pair of bearings and a: driven bevel element meshing with the drive level element at a point between the pair of bearings.

According to the ninth aspect, an improved supporting permits an ensured meshing between drive and driven bevel elements.

According to a tenth aspect of the invention, the power transfer train further includes a coupling adaptive for a differential transmission of the drive torque.

According to the tenth aspect, drive torque is transmittable to a second drive train in a differential manner, with a light-weighted structure and increased flexibility in layout.

According to an eleventh aspect of the invention, the second drive train comprises a second final reduction gear connected to the coupling and a second differential gear connected between the second final reduction gear and the second pair of drive wheels.

According to the eleventh aspect, a differential transmission has a defined differential action.

According to a twelfth aspect of the invention, the power train further comprises a transfer housing for accommodating the first differential gear and part of the rear transfer train, an internal space defined inside the transfer housing and connected inside the transmission, and a body of lubricant filled in the internal space.

According to the twelfth aspect, a possible elimination of seal member between a transmission and a transfer housing allows for the more compact design.

BRIEF DESCRIPTION OF THE ACCOMPANYING DRAWINGS

The above and further objects and novel features of the present invention will more fully appear from the following detailed description when the same is read in conjunction with the accompanying drawings, in which.

DETAILED DESCRIPTION OF THE PREFERRED EMBODIMENTS

There will be detailed below the preferred embodiments of the present invention with reference to FIGS. 4 to 10. Like members are designated by like reference characters.

Figure 4:
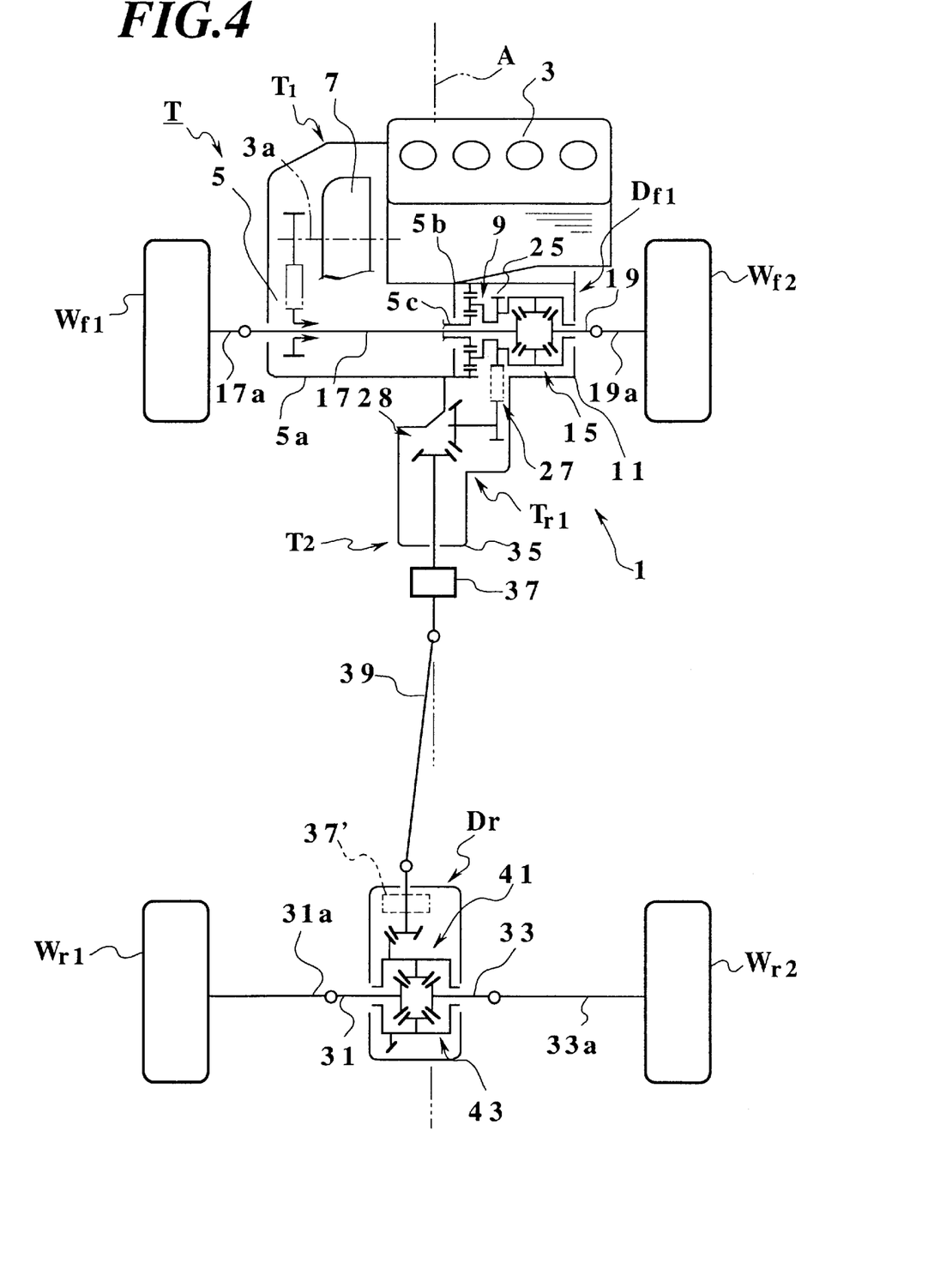
FIG. 4 is a block diagram of a four-wheel drive vehicle with a power train according to an embodiment of the invention.
Figure 5:
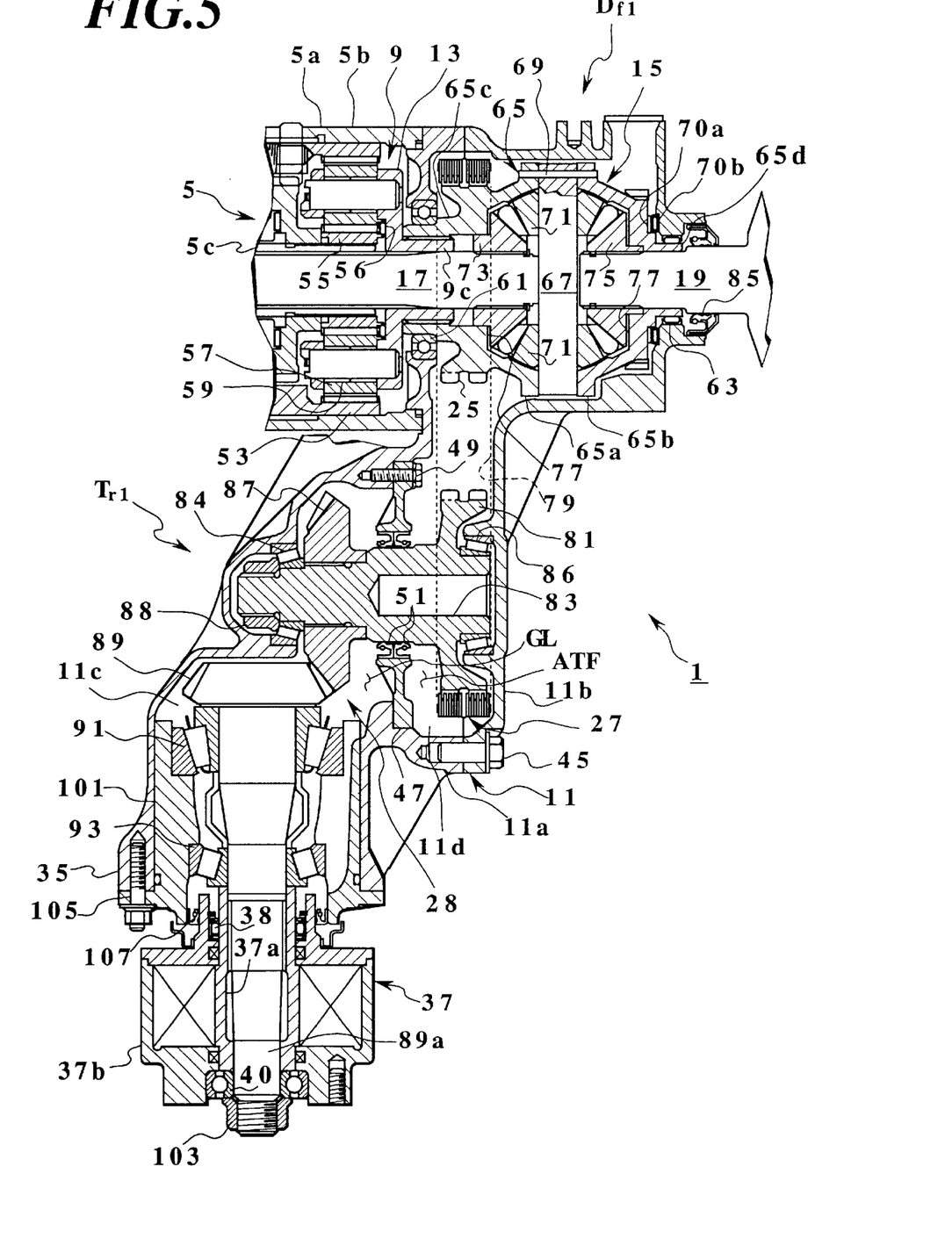
FIG. 5 is a section a power transfer device of the power train of FIG. 4.

FIG. 4 shows drive connections in a four-wheel drive automotive vehicle equipped with a power train T including a power transfer device 1 according to a first embodiment of the invention, and FIG. 5, a section of the transfer device 1.

As shown in FIG. 4, the automotive vehicle has a horizontal front engine 3 with a crankshaft axis 3a extending in a transverse direction of the vehicle, and a total of four drive wheels, i.e., a pair of left and right front wheels Wf1, Wf2 and a pair of left and right rear wheels Wr1, Wr2. The front wheels Wf1, Wf2 are driven with shafts 17a, 19a articulating on outer ends of left and right front axles 17, 19. Likewise, the rear wheels Wr1, Wr2 are driven with shafts 31a, 33a articulating on outer ends of left and right rear axles 31, 33.

Drive power generated at the engine 3 is transmitted as torque from a crankshaft of the engine 2 to the front and rear left and right axles 17, 19 and 31, 33 in a differentially distributing manner through the power train T.

The power train T comprises a first power train T1 for driving the front axles 17, 19, and a second power train T2 for driving the rear axles 31, 33.

The first power train T1 comprises: an automatic transmission gear box (hereafter sometimes "transmission") 5 that: may be composed of a planetary gear set and a multidisc clutch; and a front drive: train Df1 that includes a front final speed reduction gear mechanism (hereafter sometimes "front final gear") 9 of a planetary gear type and a front differential gear set (hereafter sometimes "front differential") 15 of a bevel gear type, The second power train 12 comprises: a rear transfer train Tr1 that includes a chain drive transfer mechanism 27, a drive direction changing gear set 28 and a fluid coupling 37;

a propeller shaft 39; and a rear drive train Dr that includes a rear final speed reduction gear mechanism (hereafter sometimes "rear final gear") 41 and a rear differential gear set (hereafter sometimes "rear differential") 43. The coupling 37 may be any differential power coupling, such as of a solid type or a fluid type, e.g. oil pump type, and may be replaced by a similar coupling 37' installed between the propeller shaft 39 and the rear final gear 41.

The transfer device 1 comprises a power transfer mechanism composed of the front drive train Df1 and the rear transfer train Tr1, and a transfer housing 11 for accommodating therein the power transfer mechanism except for the front final gear 9 and the fluid coupling 37. The transfer housing 11 extends substantially in a longitudinal direction of the vehicle, transversely offsetting at an intermediate portion to have a rear portion centered to a longitudinal centerline A of the vehicle. The housing 11 has an inside region communicating at a front part thereof with an inside region of a right peripheral part 5b of a transmission casing 5a, where the transmission 5 has the output shaft 5c and the front final gear 9 is fitted thereto.

In the embodiment, the second power train T2 is branched from the first power train T1. However, in a modification for use in a gasoline/battery hybrid car, first and second power trains may be joined at their intermediate points.

The transmission 5 is transversely installed behind the engine 3. Drive torque from the engine 3 is input through a torque converter 7 to the transmission 5, where it is once changed in speed to be supplied from an output shaft 5c to the front drive train Df1, i.e. to a combination of the front final gear 9, where drive torque is again changed in speed, and the front differential 15, where it is differentially distributed to the left and right front axles 17, 19, which drive the left and right front wheels Wf1, Wf2, respectively.

The left axle 17 extends through a radially central part of the front final gear 9. More specifically, as shown in FIG. 5, the output shaft 5c of the transmission 5 is hollowed and splined to an annular sun gear 55 of the front final gear 9 of which a planet carrier 13 has a hollowed shaft part 9c, and the left and right front axles 17, 19 are both aligned thereto. The left axle 17 extends through the shaft part 9c of the planet carrier 13 and the sun gear 55 of the front final gear 9, as well as through the output shaft 5c of the transmission 5.

The front final gear 9 has a ring gear 53 serrated along an outer circumference thereof to be integrally fixed inside the peripheral part 5b of the transmission casing 5a and kept from a relative rotation thereto, and a plurality of planet gears 57 intermeshing between the ring gear 53 and the sun gear 55, which planet gears 51 are rotatably fitted via bearings 59 on planet support shafts fixed to the planet carrier 13. A number of thrust bearings 56 are interposed between the planet carrier 13 and the sun gear 55. The shaft part 9c of the planet carrier 13 constitutes a drive torque output element of the front final gear 9 and a drive torque input element to the inner region of the transfer housing 11.

As shown in FIG. 4, the front drive train Df1 has a drive chain sprocket 25 provided thereon as a branching element to the rear transfer train Tr1 and disposed between the font final gear 9 and the front differential 15. The drive sprocket 25 is integrally formed on a later-described drive component (65a) of the front differential 15, so that speed-reduced drive torque from the front final gear 9 is shared therebetween.

Drive torque shared to the sprocket 25 is rearwardly transferred through the rear transfer train Dr1, i.e. through the chain drive transfer mechanism 27, drive direction changing gear set 28 and fluid coupling 37. The coupling 37 is mounted to a rear end part 35 of the transfer housing 11.

Rearwardly transferred drive torque is transmitted via the propeller shaft 39 to the rear drive train Dr, where it is input to the rear final gear 41, where it is again reduced in speed to be supplied to the rear differential 43, where it is differentially distributed to the left and right rear axles 31, 33 driving the left and right rear wheels Wr1, Wr2, respectively.

As shown in FIG. 5, the transfer housing 11 comprises a left housing 11a and a right housing 11b fastened to each other, using bolts 45. The entire housing 11 defines a single inner space that is separated into a left chamber 1c and a right chamber 11d by a transversely central annular wall 47 which is fixed to a mediate part of the left housing 11a by bolts 49.

The right chamber 11d includes the front inner region of the transfer housing 11 communicating with the inner region of the transmission casing 5a, and is lubricated with an automatic transmission fluid ATF commonly employed therebetween. The left chamber 11c is filled with gear lubricant GL The left and right chambers 11c, 11d are sealed from each other by a pair of opposing seal members 51 installed between an inner circumference of the central wall 47 and an intermediate shaft member 83 which transversely extends through the central wall 47 and which is rotatably supported by left and right bearings 84, 86 fixed to the left ad right housings 11a, 11b. Relative to outside the housing 11, the left chamber 11c is sealed at the rear end part 35 with a seal member 107, and the right chamber 11d, at a right end part with a seal member 85.

The right chamber 11d accommodates the front differential 15 for distribution of shared drive torque to the left and right front axles 17, 19, and the chain drive transfer mechanism 27 for transference of shared drive torque in longitudinal direction of the vehicle.

The front differential 15 has a differential casing assembly 65 as a combined combination of left and right differential casing members 65a, 65b rotatable about the left and right front axles 17, 19, respectively The left differential casing member 65a has a leftwardly extending relatively long hollowed shaft part 65c coaxially arranged about the left axle 17, splined on the shaft part 9c of the planet carrier 13 of the front final gear 9 and rotatably supported by a left bearing 61 fixed in a front part of left housing 11a of the transfer housing 11. The right differential casing member 65b has a rightwardly extending relatively short hollowed shaft part 65d slidably fitted on the right axle 19 and rotatably supported by a right bearing 63 fixed in the right end part of right housing 11b of the transfer housing 11. Between the right casing member 65b and the right housing 11b there is interposed a combination of a clearance adjusting plate 70a and a thrust bearing 70b. The left and right casing members 65a, 65b are combined together, with a pinion shaft 67 inserted therebetween and integrated by a pin 69. The pinion shaft 67 has fitted thereon a plurality of revolving pinion gears 71 meshing with a pair of mutually opposing left and right side gears 73, 75 splined at their inner circumferences on the left and right axles 17, 19. The left and right sides gears 73, 75 abut at their back sides on inner steps of the shaft parts 65c, 65d of the left and right casing members 65a, 65b, with washers 77 placed therebewteen, respectively.

The drive sprocket 25 is integrally formed on the shaft part 65c of the left differential casing member 65a. The chain drive transfer mechanism 27 comprises the drive sprocket 25, a driven sprocket 81 integrally formed on a right part of the intermediate shaft member 83, and a looped chain 79 wound over the drive and driven sprockets 25, 81. The chain 79 is relaxed when applied over the sprockets 25, 81, and becomes tensioned when transmitting drive power.

The left chamber 11c of transfer housing 11 accommodates the drive direction changing gear set 28 that comprises a bevel gear 87 and a bevel pinion 89 as principal gear elements thereof meshing with each other, with their rotation axes intersecting at right angles. The bevel gear 87 is splined on a diameter-reduced left part of the intermediate shaft member 83 and tightened in position together with the bearing 84 by a nut 88 screwed on a left end of the shaft member 83. The bevel pinion 89 has a rearwardly extending stem part, as a drive shaft element rotatably supported by front and rear bearings 91, 93 fixed in a pinion carrier 35, which stem part is provided with an exposed rear extension 89a for the fluid coupling 37 to be mounted thereon.

The fluid coupling 37 comprises an inner hub member 37a splined on the rear extension 89a of the pinion stem part, and an outer housing member 37b rotatably fitted at a front end thereof on the inner hub member 37a, with a needle bearing 38 installed therebetween, and at a rear end thereof on the pinion stem extension 89a, with a ball bearing 40 installed therebetween. The inner member 37a is integrally rotatable with the bevel pinion 89. The outer member 37b is rotatable relative to the inner member 37a and the stem extension 89a, and is connected at a bottom part thereof to a front end of the propeller shaft 39 (FIG. 4). The inner and outer members 37a, 37b are connected to each other with a body of viscous fluid filled therebetween.

The pinion carrier 101 having assembled therein the bevel pinion 89 with the fluid coupling 37 attached thereto is inserted in the rear end part 35 of the transfer housing 11 and fixed thereto by bolts 105.

The first embodiment provides various advantages, such that:

(a) The front drive train Df1 coaxially aligned to the left and right front axles 17, 19 of the four-wheel drive vehicle is commonly applicable as a front drive train for a two-wheel drive vehicle that has eliminated a second power train (T2) including a chain (79) and preferably a drive sprocket (25) also. Likewise, a front drive train for a two-wheel drive vehicle may be modified as a front drive train Df1 for a four-wheel drive vehicle with a reduced increase in transverse size as well as in weight.

(b) Two-wheel drive and four-wheel drive vehicles have an increased interchangeability of components therebetween.

(c) The front axles 17, 19 are permitted to have increased external lengths outside the transfer housing 11

(d) The drive sprocket 25 is integrated with a front differential component (65a) allowing for a simplified support structure and a reduced cost.

(e) The chain drive transfer mechanism 27 in the rear transfer train (Tr1) permits a flexible design of a drive direction changing gear set (28).

(f) The drive direction changing gear set 28 is arranged close to the vehicle centerline A, with an improved transverse balance.

(g) The right chamber 11d of the transfer housing 11 directly communicates with an internal region of the transmission 5, permitting a common use of oil ATF and a reduced transverse dimension with no sealing or piping installed therebetween.

(b) The fluid coupling 37 permits a light-weighted differential structure without a gearing center differential.

Figure 6:
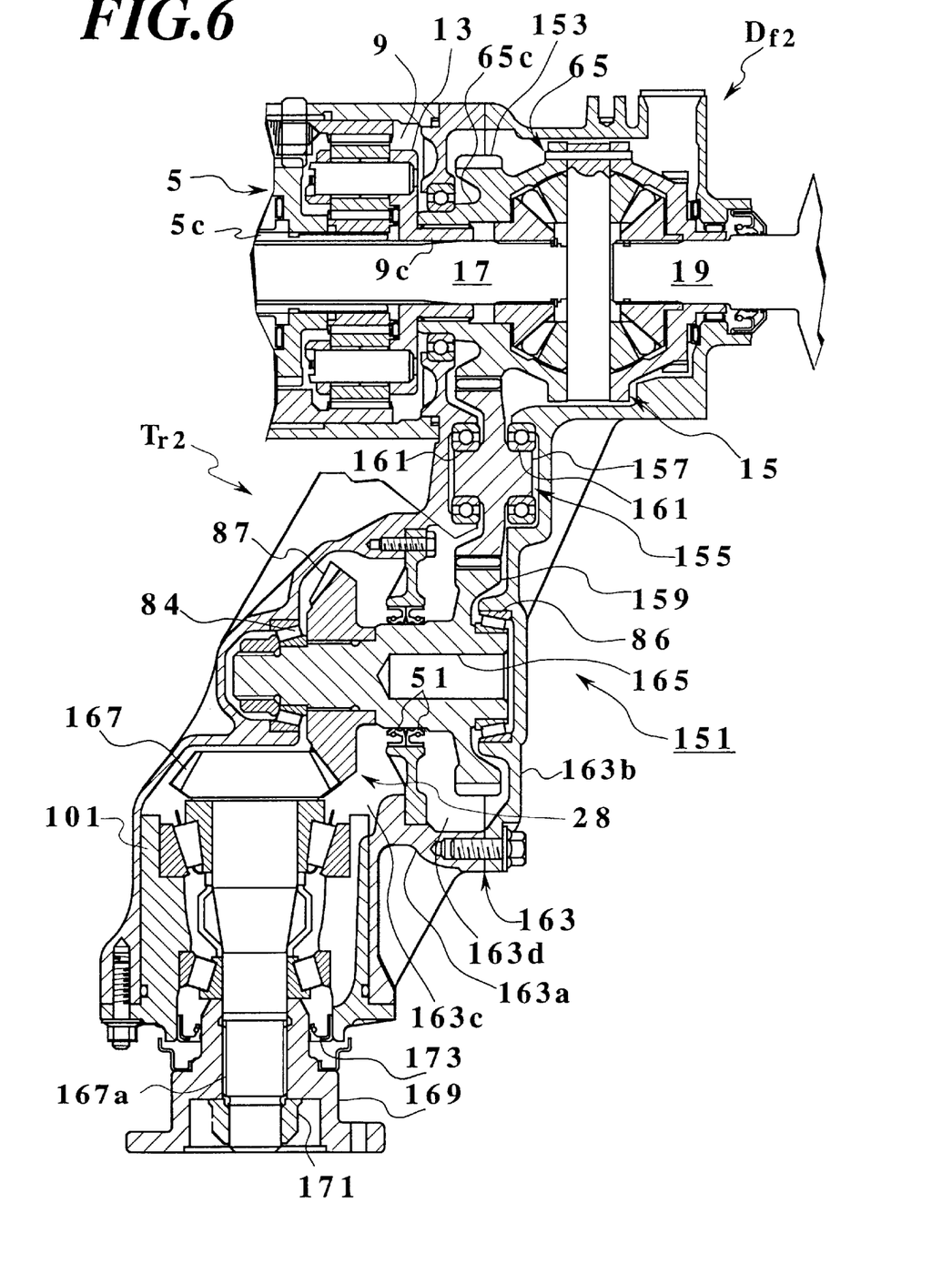
FIG. 6 is a section of a power transfer device of a four-wheel drive vehicle power train according to another embodiment of the invention.

(i) The chain drive transfer mechanism 27 prevents noises and vibrations of the first power train T1 from being transmitted to the second power train 12. A similar effect is achieved by the coupling 37, to some extent, FIG. 6 shows a transfer device 151 of a four-wheel drive vehicle power train according to a second embodiment of the invention.

The second embodiment is different from the first embodiment in that the power train employs a geared transfer mechanism 155 in place of the chain drive transfer mechanism 27 (FIG. 5) and a flanged solid coupling 169 in place of the fluid coupling 37 (FIG. 5)

The transfer device 151 thus comprises a front drive train Df2 that includes a front final gear 9 and a front differential 15 having a shaft part 65c of a differential casing assembly 65 formed with an integral drive gear 153 as a power branching element, and a rear transfer train Tr2 that includes the geared transfer mechanism 155, a drive direction changing gear set 28 and the coupling 169.

The transfer mechanism 155 comprises the drive gear 153, a driven gear 159, and an idler gear 157 intermeshing therebetween. The driven gear 159 is integrally formed on a right part of a transversely extending intermediate shaft member 165, which is rotatably supported by left and right bearings 84, 86 fixed in walls of left and right housings 163a, 163b of a transfer housing 163, respectively. The idler gear 157 also is rotatably supported by left and right bearings 161. The left and right housings 163a. 163b define left and right chambers 163c, 163d, respectively, which are sealed from each other by seal members 51.

The drive direction changing gear set 28 comprises a bevel gear 87 splined on the intermediate shaft member 165, and a bevel pinion 167 rotatably installed in a pinion carrier 101. The coupling 169 is splined on a rear extension 167a of a stem of the bevel pinion 167 and stopped by a nut 171 screwed thereto, as a differential coupling (37', FIG. 4) is installed in a rear drive train. A seal member 173 is interposed between the pinion carrier 101 and the coupling 169.

Drive torque from an output shaft 5c of a transmission 5 is reduced in speed at the front final gear 9 and input from a shaft part 9c of a planet carrier 13 of the final gear 9 to the shaft part 65c of the differential casing assembly 65, where it is shared to be transmitted on the one hand through the front differential 15 to left and right front axles 17, 19 and on the other hand through the rear transfer train Tr2 toward the rear drive train.

The second embodiment has like advantages to the first embodiment, subject to the advantages (h) and (1), as the sprocket 25 in the advantage (d) reads gear 153.

Figure 7:
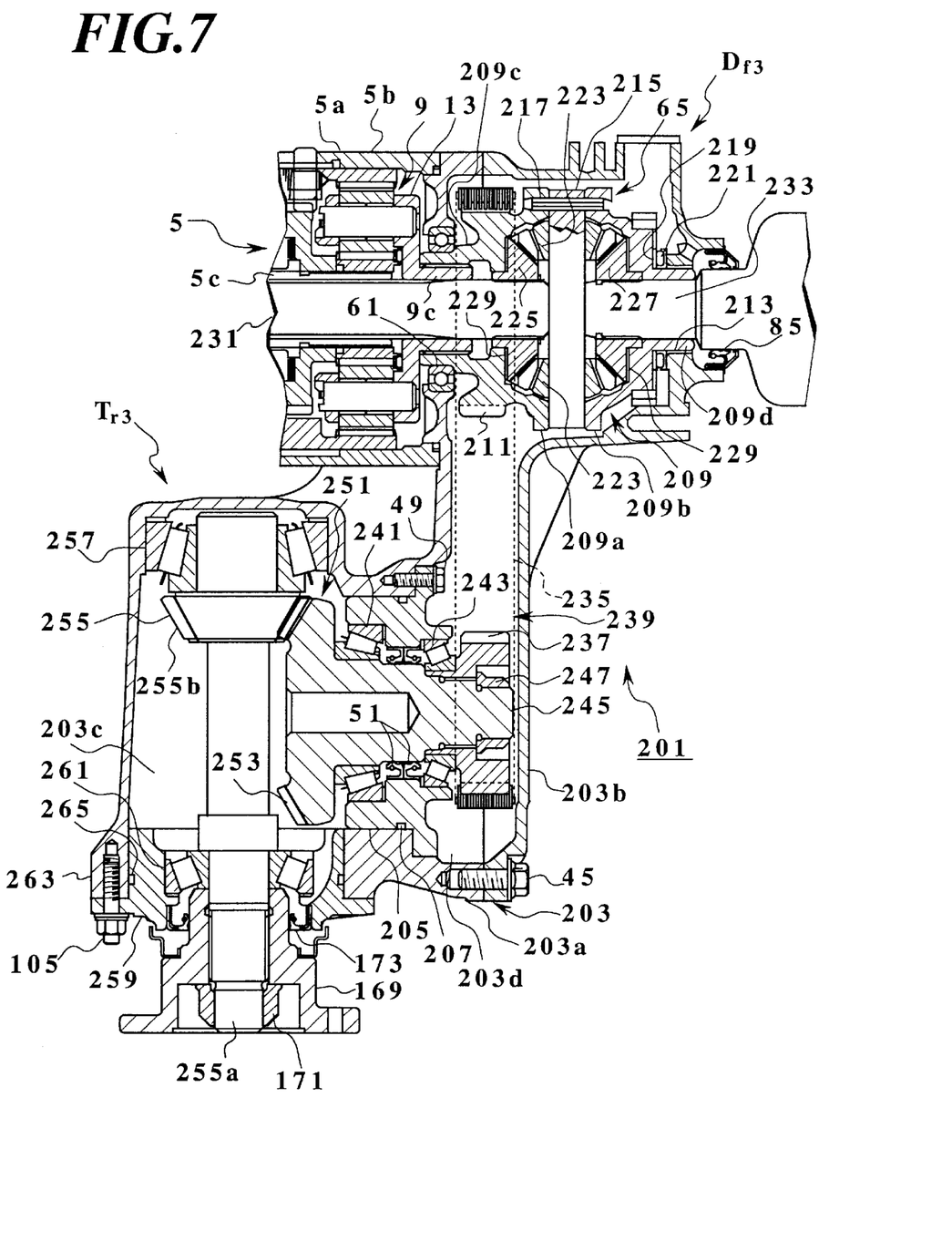
FIG. 7 is a section of a power transfer device of a four-wheel drive vehicle power train according to another embodiment of the invention.
Figure 8:
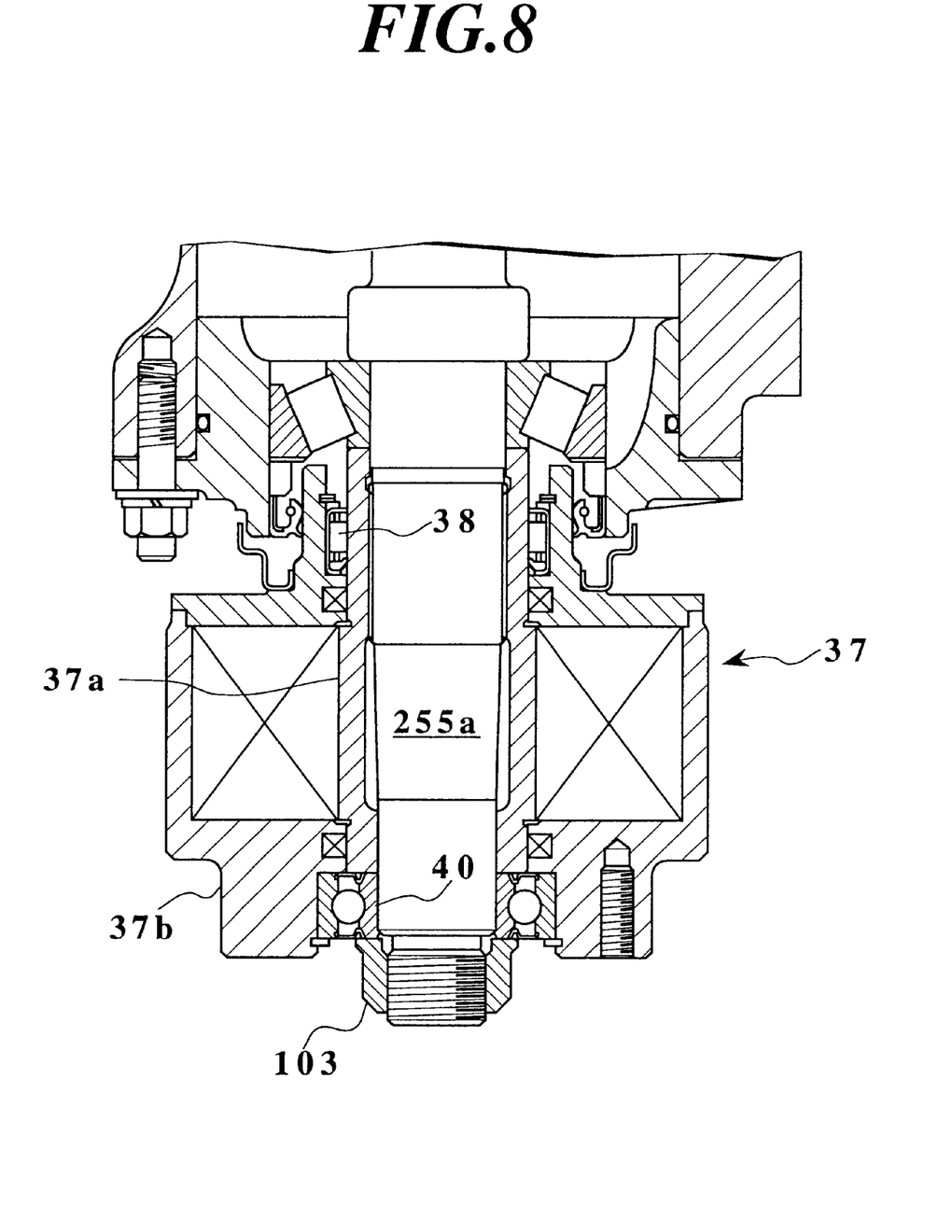
FIG. 8 is a section of a modification in part of the power transfer device of FIG. 7.

FIG. 7 shows a transfer device 201 of a four-wheel drive vehicle power train according to a third embodiment of the invention. FIG. 8 shows a modification of the third embodiment.

The third embodiment is different from the first embodiment in that the power train employs a chain drive transfer mechanism 239 with a longer span than the transfer mechanism 27 (FIG. 5), a drive direction changing gear set 251 modified in arrangement from the gear set 28 (FIG. 5) and a flanged solid coupling 169 in place of the fluid coupling 37 (FIG. 5). In the modification, the flanged coupling 169 is replaced by a fluid coupling 37.

The transfer device 201 comprises a power transfer unit Df3+Tr3 and an enclosure 5b +203 therefor. The transfer unit comprises a front drive train Df3 that includes a front final gear 9 and a front differential 209 having an integral drive sprocket 211 as a power branching element, and a rear transfer train Tr3 that includes the long-span chain drive transfer mechanism 239, the modified drive direction changing gear set 251 and the coupling 169. The enclosure comprises a right peripheral part 5b of a casing 5a of a transmission 5 and a transfer housing 203.

The peripheral part 5b of the transmission casing 5a accommodates an output shaft 5c of the transmission 5 and the front final gear 9 of a planetary type.

The transfer housing 203 comprises a left housing 203a and a right housing 203b fastened to each other, using bolts 45. The entire housing 203 defines a single inner space separated into a left chamber 203c and a right chamber 203d by a transversely central annular wall 205 fixed to a mediate part of the left housing 203a by bolts 49.

The right chamber 203d has its front inner region communicating with an inner region of the transmission casing 5a, and is lubricated with an automatic transmission fluid (ATF, FIG. 5) commonly employed therebetween. The left chamber 203c is filled with gear lubricant (GL, FIG. 5). The left and right chambers 203c, 203d are sealed from each other by seal members 51 installed between an axially central inner circumferential part of the central wall 205 and anaxially central outer circumferential part of an intermediate shaft member 245 extending through the wall 205, as well as by an O ring 207 between an outer circumference of the central wall 205 and an inner wall of the left housing 203a. The intermediate shaft member 245 is rotatably supported by left and right bearings 241, 243 installed between a pair left and right stepped inner circumferential parts of the central wall 205 and a pair of left and right stepped outer circumferential parts of the shaft member 245, respectively. Relative to outside the housing 203, the left chamber 203c is sealed at a rear end part 263 of the left housing 203a with a seal member 173, and the right chamber 203d, at a right end part of the right housing 203b with a seal member 85.

The right chamber 203d accommodates the front differential 209 for distribution of shared drive torque to left and right front axles 231, 233, and the long-span chain drive transfer mechanism 239 for transference of shared drive torque in longitudinal direction of a vehicle.

The front differential 209 has a differential casing assembly 65 as a combination of left and right differential casing members 209a, 209b rotatable about the left and right front axles 231, 233, respectively.

The left differential casing member 209a has a leftwardly extending relatively long hollowed shaft part 209c coaxially arranged about the left axle 231, splined on a shaft part 9c of a planet carrier 13 of the front final gear 9 and rotatably supported by a left bearing 61 fixed in a front part of the left housing 203a. The right differential casing member 209b has a rightwardly extending relatively short hollowed shaft part 209d slidably fitted on the right axle 233 and rotatably supported by a right bearing 213 fixed in the right end part of the right housing 203b. Between the right casing member 209b and the right housing 203b there is interposed a combination of a clearance adjusting plate 219 and a thrust bearing 221. The left and right casing members 209a, 209b are combined together, with a pinion shaft 215 inserted therebetween and integrated by a spring pin element 217. The pinion shaft 215 has fitted thereon a plurality of revolving pinion gears 223 meshing with a pair of mutually opposing left and right side gears 225, 227 splined at their inner circumferences on the left and right axles 231, 233. The left and right sides gears 225, 227 abut at their back sides on inner steps of the shaft parts 209c, 209d of the left and right casing members 209a, 209b, with washers 229 placed therebewteen, respectively The drive sprocket 211 is formed on the shaft part 209c of differential casing member 209a. The chain drive transfer mechanism 239 comprises the drive sprocket 211, a driven sprocket 81 splined on a right part of the intermediate shaft member 245 and stopped with a nut 247 screwed to a right end of the shaft member 245, and a relatively long looped chain 235 wound over the drive and driven sprockets 211, 245.

The left chamber 203c of transfer housing 209 accommodates the drive direction changing gear set 251 that comprises a bevel gear 253 and a bevel pinion 255 meshing with each other, with their rotation axes intersecting at right angles. The bevel gear 253 is integrally formed on a diameter-expanded left part of the intermediate shaft member 245. The bevel pinion 255 comprises a pinion shaft part 255a and a bevel gear part 255b integrally formed thereon. The gear part 255b is located in a nearer position to the transmission S than a rotation axis of the intermediate shaft 245, i.e. it is set in position to mesh with a front-most oblique region of a toothed part of the bevel gear 253. The shaft part 255a is rotatably supported at a front end thereof by a front bearing 257 and in part of length of a rear part thereof by a rear bearing 261. The front bearing 257 is fixed to a left front wall of the left housing 203a.

The bevel pinion 255 may preferably comprise: a pinion shaft member 255a having a front part with a relatively large diameter, an intermediate part formed with a reduced diameter and provided with two or more stop elements of which a front one may be a rear face of the front part, and a rear part with diameters equivalent to or smaller than the intermediate part; and an invertible pinion gear member 255b splined or keyed to the intermediate part of the shaft member 255b and stopped by the stop elements at a selective point on length of the intermediate part. The pinion gear member 255b may then be separated into halves or segments to be assembled together.

The rear bearing 261 is fixed in a coupling adapter 259, which is fitted in the rear end part 263 of the transfer housing 203, with an O ring 265 tight-fitted therebetween, and fastened thereto by bolts 105. The flanged coupling 169 is splined on a rear part of the pinion shaft part 255a and stopped by a nut 171 screwed to a rear end of the shaft part 255a. The coupling 169 is connectable at a flange part thereof to a propeller shaft (39, FIG. 4).

In the modification illustrated in FIG. 8, the coupling 37 comprises an inner hub member 37a splined on the rear part of the pinion shaft part 255a, and an outer housing member 37b rotatably fitted at a front end thereof on the inner hub member 37a, with a needle bearing 38 installed therebetween, and at a rear end thereof on the rear end of the pinion shaft part 255a, with a ball bearing 40 installed therebetween. The inner member 37a is integrally rotatable with the shaft part 255a of the bevel pinion 255 (FIG. 7). The outer member 37b is rotatable relative to the inner member 37a and the pinion haft part 255a, and is connected at a bottom part thereof to a front end of the propeller haft 39 (FIG. 4). The inner and outer members 37a, 37b are connected to each other with a body of viscous fluid filled therebetween.

The third embodiment has like advantages to the first embodiment, subject to the advantage (h) covered by the modification of FIG. 8.

The chain drive transfer mechanism 239 has a relatively long span between axes of the drive and driven sprockets 211, 237. However, the transfer device 201 in the present embodiment may have a shorter total longitudinal length than other embodiments, as the bevel gear part 255b is located at a smaller distance relative to the transmission 5.

The bevel pinion 255 is supported by the front and rear bearings 257, 261, with the gear part 225*b* intervening therebetween, permitting an ensured stable meshing with the bevel gear 253.

Figure 9:
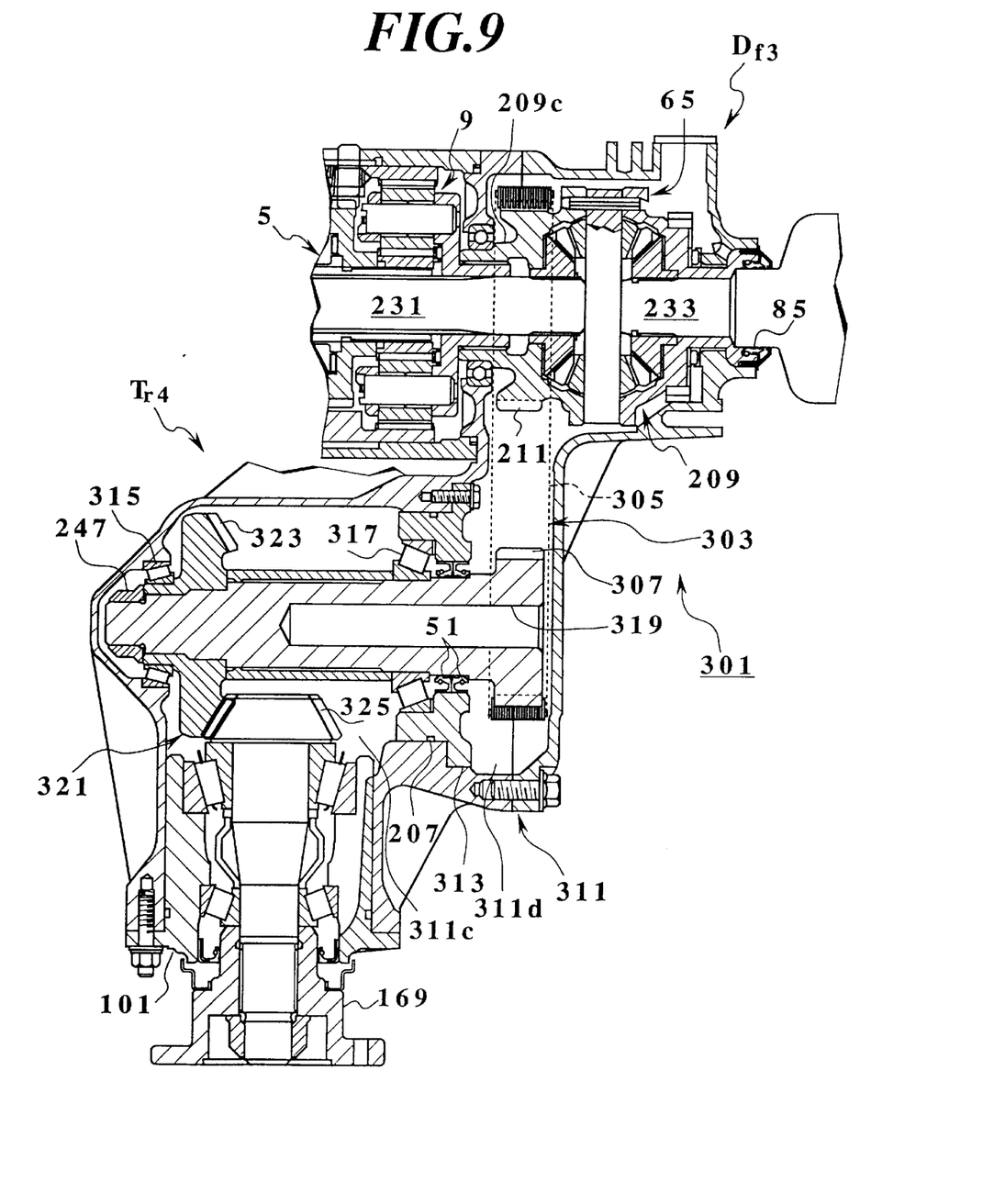
FIG. 9 is a section of a power transfer device of a four-wheel drive vehicle power train according to another embodiment of the invention.

FIG. 9 shows a transfer device 301 of a four-wheel drive vehicle power train according to a fourth embodiment of the invention.

The fourth embodiment is different from the third embodiment in that the power train employs a transversely relatively long intermediate shaft member 319 in place of the intermediate shaft member 245 (FIG. 7) and a bevel pinion 325 modified in position relative to the pinion 255 (FIG. 7).

The transfer device 301 thus comprises: a front drive train Df3 that includes a front final gear 9 receiving drive torque from a transmission 5, and a frost differential 209 distributing shared torque to left and right front axles 231, 233 and having a differential casing assembly 65 of which a shaft part 209*c* is formed with an integral drive sprocket 211 as a power branching element; and a rear transfer train Tr4 that includes a chain drive transfer mechanism 303, a drive direction changing gear set 321 and a flanged solid coupling 169.

The chain drive transfer mechanism 303 comprises the drive sprocket 211, a driven sprocket 307, and a looped chain 305 wound over the drive and driven sprockets 211, 307. The driven sprocket 307 is integrally formed on a right end part of the intermediate shaft member 319 in a right chamber 311*d* of a transfer housing 311. The intermediate shaft member 319 is rotatably supported at a left end part thereof by a bearing 315, which is disposed in a leftmost region of a left chamber 311*c* of the transfer housing 311, and at a right part thereof by a bearing 317, which is disposed in a rightmost region of the left chamber 311*c* and fixed in a stepped inner circumferential part of an annular central wall 313.

The right chamber 311*d* accommodates the front differential 209 and the chain drive transfer mechanism 303, and is sealed by a right seal member 85 to the outside and by combination of an O ring 207 and seal members 51 to the left chamber 311*c* accommodating the drive direction changing gear set 321.

The direction changing gear set 321 comprises: a bevel gear 323 toothed on a right oblique side thereof, splined on the intermediate shaft member 319, interposed between the bearings 315, 317, disposed in a left region of the left chamber 311*c*, and stopped with a nut 247 screwed to a left end of the shaft member 319; and a bevel pinion 325 toothed on a front oblique side thereof, disposed at a transversely intermediate position between the bearings 315, 317, arranged in a perpendicular position to a rotation axis of the shaft member 319, rotatably supported by a pinion carrier 101, and set to mesh at a left front side thereof with a rear right side of the bevel gear 323. The bevel pinion 325 may be a reproduction of the bevel pinion 167 (FIG. 6), subject to a teeth number.

The fourth embodiment has like advantages to the first embodiment, subject to the advantage (h). A relatively large span between the bearings 315, 317 permits an ensured meshing between the bevel gear 323 and the bevel pinion 325.

Figure 10:
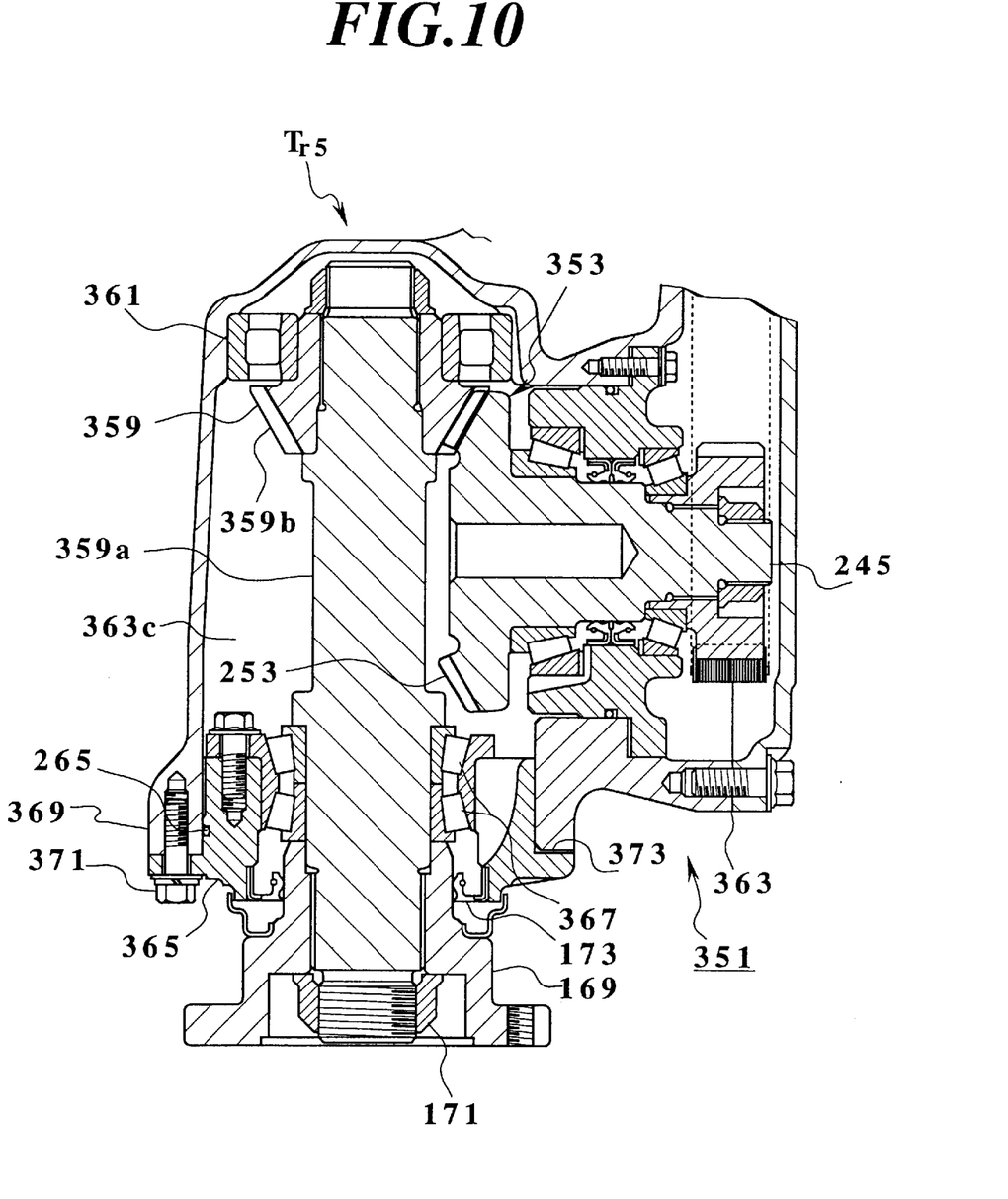
FIG. 10 is a section of a drive direction changing gear set of a four-wheel drive vehicle power train according to another embodiment of the invention.

FIG. 10 shows a principal portion of a transfer device 351 of a four-wheel drive vehicle power train according to a fifth embodiment of the invention.

The fifth embodiment is different from the third embodiment in that a rear transfer train Tr4 of the power train employs a drive direction changing gear set 353 modified in arrangement from the gear set 251 (FIG. 7).

The transfer device 351 comprises a power transfer unit (Df3(FIG. 7)+Tr5) and an enclosure (5*b*(FIG. 7)+363) therefor. The transfer unit comprises a front drive train (Df3, FIG. 7) that includes a front final gear (9, FIG. 7) and a front differential (209, FIG. 7), and the rear transfer train Tr5 that includes a long-span chain drive transfer mechanism (239, FIG. 7), the modified drive direction changing gear set 353 and a flanged solid coupling 169. The enclosure comprises a right peripheral part (5*b*, FIG. 7) of a transmission casing (5*a*, FIG. 7) and a transfer housing 363.

The transfer housing 363 accommodates in a left chamber 363*c* thereof the drive direction changing gear set 353 that comprises a bevel gear 253 integrally formed on an intermediate shaft member 245, and a bevel pinion 359 meshing therewith, having their rotation axes intersecting at right angles.

The bevel pinion 359 comprises a pinion shaft 359*a* and a pinion gear 359*b* splined on a front end part of the shaft 359*a* and tightened with a nut. The gear 359*b* is rotatably supported by a roller bearing 361 fixed in left front wall of the housing 363, The bearing 361 allows for an increased radial load due to a meshing with the bevel gear 253. Backlash in meshing is adjustable with a shim 373 between the housing 363 and a pinion adapter 365. The shaft 359*a* is rotatably supported at a rear mediate part thereof with a pair of tapered front and rear roller bearings 367 bolted to be fixed to the adapter 365. The adapter 365 is fixed to a rear end part 369 of the housing 363, with an O ring 265 put therebetween.

The coupling 169 is spliced on a rear end part of the pinion shaft 359*a* and stopped by a nut 171 screwed thereto. About the coupling 169 is sealed with a seal member 173.

It will be seen that a differential fluid coupling may preferably substitute for the respective coupling in the embodiments.

It will also be seen that the respective figures are illustrative and the rear differential 43 of FIG. 4 showing a ring gear driven at a left end may have a substituted ring gear to be driven at a right end, as it is applied to the embodiments illustrated by FIGS. 7, 9 and 10 where the flanged coupling 169 has a different rotational direction relative to FIGS. 5 and 6.

While preferred embodiments of the present invention have been described using specific terms, such description is for illustrative purposes, and it is to be understood that changes and variations may be made without departing from the spirit or scope of the following claims.

What is claimed is:

1. A vehicle comprising an engine, a pair of first drive wheels and a pair of second drive wheels and a power train interconnecting the engine with the pair of first drive wheels and the pair of second drive wheels, wherein said power train comprises:

a first power train comprising:
 a transmission connected to the engine; and
 a first drive train comprising
  a first final reduction gear comprising a first set of engaged gear members configured for fixed reduction of rotational speed therethrough, the first set of engaged gear members including a torque inputting first gear member engaged with an output shaft of the transmission extending in a transverse direction of the vehicle,
  a first differential having an input gear member engaged with a torque outputting second gear member of the first set of engaged gear members, and a pair of first axles connected between a pair of differentially operative output gear members of the first differential and the pair of first drive wheels, respectively, and extending in the transverse direction, the pair of first axles including a first axle arranged coaxial to and passing through the output shaft of the transmission; and a second power train comprising:
  a power transfer train branched in a longitudinal direction of the vehicle from the first drive train, through a branching element formed on the input gear member of the first differential; and
  a second drive train connected between the power transfer train and the pair of second drive wheels, wherein the power transfer train comprises a longitudinal transfer mechanism configured to transfer drive torque shared from the input gear member of the first differential in the longitudinal direction, wherein the branching element comprises a drive sprocket integrally formed on the input gear member of the first differential, and longitudinal transfer mechanism comprises a chain applied over the drive sprocket.

2. A vehicle comprising an engine, a pair of first drive wheels and a pair of second drive wheels and a power train interconnecting the engine with the pair of first drive wheels and the pair of second drive wheels, wherein said power train comprises:

a first power train comprising:
  a transmission connected to the engine; and
  a first drive train comprising
    a first final reduction gear comprising a first set of engaged gear members configured for fixed reduction of rotational speed therethrough, the first set of engaged gear members including a torque inputting first gear member engaged with an output shaft of the transmission extending in a transverse direction of the vehicle,
    a first differential having an input gear member engaged with a torque outputting second gear member of the first set of engaged gear members, and
    a pair of first axles connected between a pair of differentially operative output gear members of the first differential and the pair of first drive wheels, respectively, and extending in the transverse direction, the pair of first axles including a first axle arranged coaxial to and passing through the output shaft of the transmission; and a second power train comprising:
  a power transfer train branched in a longitudinal direction of the vehicle from the first drive train, through a branching element formed on the input gear member of the first differential; and
  a second drive train connected between the power transfer train and the pair of second drive wheels, wherein the second power train further comprises a differential mechanism connected between the power transfer train and the second drive train, wherein the differential mechanism comprises a coupling mounted on an output shaft of the power transfer train, wherein the second drive train comprises a second final reduction gear connected to the coupling, and a second differential connected between the second final reduction gear and the pair of second drive wheel.

3. A vehicle comprising an engine, a pair of first drive wheels and a pair of second drive wheels and a power train interconnecting the engine with the pair of first drive wheels and the pair of second drive wheels, wherein the power train comprises:

a first power train comprising:
  a transmission connected to the engine; and
  a first drive train comprising
    a first final reduction gear comprising a first set of engaged gear members configured for fixed reduction of rotational speed therethrough, the first set of engaged gear members including a torque inputting first gear member engaged with an output shaft of the transmission extending in a transverse direction of the vehicle,
    a first differential having an input gear member engaged with a torque outputting second gear member of the first set of engaged gear members, and
    a pair of first axles connected between a pair of differentially operative output gear members of the first differential and the pair of first drive wheels, respectively, and extending in the transverse direction, the pair of first axles including a first axle arranged coaxial to and passing through the output shaft of the transmission; and a second power train comprising:
  a power transfer train branched in a longitudinal direction of the vehicle from the first drive train, through a branching element formed on the input gear member of the first differential; and
  a second drive train connected between the power transfer train and the pair of second drive wheels, wherein the first final reduction gear comprises a planetary gear mechanism, and the first gear member and the second gear member of the first set of engaged gear members comprise a sun gear and a planet carrier of the planetary gear mechanism, respectively.

4. A power train comprising:
a transmission having a hollow output shaft;
a planetary gear mechanism for fixed reduction of rotational speed, said planetary gear mechanism having a sun gear engaged with the hollow output shaft, a plurality of planet gears engaged with the sun gear, and a planet carrier carrying the plurality of planet gears;
a differential having a differential case as an input gear member thereof formed with an extended part engaged with the planet carrier, and a pair of output gear members differentially operative to each other;
an axle engaged with one of the pair of output gear members of the differential, the axle passing through the hollow output shaft, the sun gear, the planet carrier, and the extended part of the differential case;
a power transfer train branched from the extended part of the differential case in a direction crossing the axle; and
a differential mechanism mounted on an output shaft of the power transfer train.

* * * * *